US011945402B2

(12) United States Patent
Kelly

(10) Patent No.: US 11,945,402 B2
(45) Date of Patent: Apr. 2, 2024

(54) METHOD AND SYSTEM FOR RELAY ATTACK PREVENTION INCORPORATING CHANNEL COHERENCE

(71) Applicant: ROBERT BOSCH (AUSTRALIA) PTY LTD, Clayton (AU)

(72) Inventor: Matthew S. Kelly, Clayton (AU)

(73) Assignee: ROBERT BOSCH (AUSTRALIA) PTY LTD, Clayton (AU)

( * ) Notice: Subject to any disclaimer, the term of this patent is extended or adjusted under 35 U.S.C. 154(b) by 126 days.

(21) Appl. No.: 17/762,340

(22) PCT Filed: Sep. 23, 2020

(86) PCT No.: PCT/AU2020/051008
§ 371 (c)(1),
(2) Date: Mar. 21, 2022

(87) PCT Pub. No.: WO2021/062463
PCT Pub. Date: Apr. 8, 2021

(65) Prior Publication Data
US 2022/0371551 A1 Nov. 24, 2022

(30) Foreign Application Priority Data
Sep. 30, 2019 (AU) .............................. 2019903676

(51) Int. Cl.
*B60R 25/24* (2013.01)
*H04B 17/27* (2015.01)
*H04B 17/318* (2015.01)

(52) U.S. Cl.
CPC .......... *B60R 25/246* (2013.01); *B60R 25/245* (2013.01); *H04B 17/27* (2015.01); *H04B 17/318* (2015.01)

(58) Field of Classification Search
CPC ............... B60R 25/246; B60R 25/245; B60R 2325/103; B60R 25/30; B60R 2325/105;
(Continued)

(56) References Cited

U.S. PATENT DOCUMENTS 9,584,542 B2 2/2017 Kim et al.
10,438,430 B2 * 10/2019 Hayashi ................. E05B 81/78
(Continued)

FOREIGN PATENT DOCUMENTS

GB 2471163 A 12/2010

OTHER PUBLICATIONS

International Search Report for PCT/AU2020/051008 dated Oct. 30, 2020.
(Continued)

*Primary Examiner* — Nam V Nguyen
(74) *Attorney, Agent, or Firm* — Norton Rose Fulbright US LLP

(57) ABSTRACT

A method/system of detecting if a relay is present in a vehicle PEPS system, including transmitting from antenna (s) of a vehicle, a first/second LF signals and determining a minimum time-gap between the signal transmissions so that the time-gap exceeds the channel-coherence-time of a high-frequency wireless-relay. A maximum time between the signals is determined by a timing requirement of the PEPS system and the maximum allowable change in a key-fob position. A time gap between the minimum/maximum times is determined. Depending on the time-gap, the system timing requirement is increased to provide a predetermined-time. At the predetermined-time, separately transmitting between the first/second LF signals, which have a known signal ratio, from a vehicle antenna to a key-fob as part of an LF challenge; measuring, at the key-fob, the signal-levels
(Continued)

of the first/second LF signals; and determining if the ratio of the first/second LF signals are within a predefined range.

9 Claims, 4 Drawing Sheets

(58) Field of Classification Search
CPC ... B60R 25/2072; B60R 25/248; H04B 17/27; H04B 17/318; H04B 1/50; H04B 17/20; G07C 2009/00555; G07C 2009/00793; G07C 9/00309; H04W 4/80; H04W 4/023; H04W 4/40
USPC .................................................. 340/5.7, 5.72
See application file for complete search history.

(56) References Cited

U.S. PATENT DOCUMENTS

| | | | | |
|---|---|---|---|---|
| 10,749,898 | B2* | 8/2020 | Rogel | H04L 63/1466 |
| 10,897,477 | B2* | 1/2021 | Motos | H04L 67/12 |
| 10,919,493 | B2* | 2/2021 | Elangovan | G07C 9/00309 |
| 11,483,320 | B2* | 10/2022 | Santavicca | H04L 9/3215 |
| 11,524,655 | B2* | 12/2022 | Kelly | H04W 12/122 |
| 11,702,035 | B2* | 7/2023 | Mori | B60R 25/248 340/5.72 |
| 2006/0114100 | A1 | 6/2006 | Ghabra et al. | |
| 2014/0022052 | A1* | 1/2014 | Lim | G07C 9/00309 340/5.61 |
| 2014/0330449 | A1* | 11/2014 | Oman | B60R 25/245 701/2 |
| 2015/0074805 | A1* | 3/2015 | Choi | G07C 9/20 726/22 |
| 2015/0302673 | A1 | 10/2015 | Seiberts et al. | |
| 2016/0332597 | A1* | 11/2016 | Tokunaga | G08C 17/02 |
| 2018/0186332 | A1* | 7/2018 | Bocca | H04W 4/40 |
| 2018/0276926 | A1 | 9/2018 | Hayashi | |
| 2019/0219678 | A1* | 7/2019 | Miyazawa | E05B 49/00 |

OTHER PUBLICATIONS

Ansaf Ibrahem Alrabady, Security of Passive Access Vehicle, Submitted to the Graduate School of Wayne State University, Detroit, Michigan in partial fulfillment of the requirements for the degree of Doctor of Philosophy, 2002, pp. 1-148.

* cited by examiner

METHOD AND SYSTEM FOR RELAY ATTACK PREVENTION INCORPORATING CHANNEL COHERENCE

FIELD OF THE INVENTION

The present invention relates to passive entry passive start (PEPS) systems and in particular, detection and/or prevention of relay attacks on PEPS systems in vehicles used to enter and/or start to the vehicle.

BACKGROUND INFORMATION

PEPS systems allow authorized users (with a valid key fob) to lock/unlock and start their vehicle without having to interact with the remote control (i.e., authorized key fob). The PEPS system may unlock or start the vehicle via a manually triggered input request (capacitive sensor, push button, etc.) if the key fob is determined to be in a valid PEPS zone.

A typical PEPS system defines operating regions such that if an authorized key fob is located within the correct operating region then the vehicle will respond to lock/unlock and start requests. PEPS regions can be defined by low frequency (LF) signal fields emitted from antennas on the vehicle. A received signal strength indicator (RSSI) is typically implemented in the authorized key fob as an abstraction of the magnetic field strength. The PEPS system may define the external operating regions and internal operating regions using the RSSI signal levels from the various antennas on the vehicle. If an authorized key fob is located within the correct regions, i.e., the RSSI levels correspond to a defined zone then the vehicle will respond to lock/unlock and start requests.

A problem associated with PEPS systems is that vehicle thieves may utilize what is known as a "relay attack" to steal the vehicle. The relay attack tricks the PEPS system into believing that the thief is an authorized user (in a defined operating region).

A relay attack generally requires two thieves ("Thief A" and "Thief B") together with the authorized user (i.e., vehicle owner or other possessor of the key fob) being in the same vicinity. A relay attack involves extending the range of the LF field so that an authorized key fob which is not in proximity of the vehicle will receive the LF challenge signal. "Thief A" carries a relay receiver (to receive the LF signal) and is located close to the vehicle while "Thief B" carries a relay transmitter (to re-transmit the LF signal) and is located in close proximity to the authorized key fob. In an "analog relay", the relay receiver receives the LF signal then up-converts the frequency to a radio frequency (RF) and transmits it over an RF link to the relay transmitter. The relay transmitter receives the RF signal and the down-converts the RF signal to LF and re-transmits the LF signal to an authorized key fob. Analog relays are independent of the modulation and encoding of the LF signal. Other relay configurations are possible, for example, a "digital relay" where the relay receiver demodulates the LF signal and then the data stream is modulated over RF and transmitted. The relay transmitter demodulates the RF signal and then the data stream is modulated over LF and re-transmitted.

A key fob automatically transmits an RF response upon receiving the LF challenge. The RF response signal will typically transmit between approximately 20-200 m back to the vehicle. If the vehicle receives this response then it will assume that the key fob is in the vicinity of the vehicle and so the request will be authenticated. In addition, the relay attack method may also be applied to extend the range of the RF response range beyond the transmit range of the key fob.

In summary, in a relay attack, thieves are able to enter and start a vehicle when the key fob is outside its normal operating area by relaying messages from one location to another to make the vehicle appear closer to the key fob.

Techniques exist which aim to prevent relay attack by analysis of the PEPS LF and UHF signals, for example, measuring the time of flight, signal vector checks and/or signal superposition, etc. These techniques are generally complicated, ineffective or expensive.

Techniques exist, such as that discussed in GB2471163 which provides a relay attack countermeasure for a PEPS system where the LF message can comprise two parts of different amplitudes where the key fob measures the amplitude difference between the two parts. However, a problem with this arrangement is that it relies on the relay being incapable of achieving the power variations of the LF signal. For example, if a "digital" relay was able to obtain the data of the key fob signal and re-transmit, the "digital" relay would need to maintain the power variations in the transmitted signal. However, the technique does not work for an RF analog relay since this type of relay will simply maintain the power variation if the signals are in the linear operation region of the relay's amplifiers.

Before turning to a summary of the present invention, it will be appreciated that the discussion of the background to the invention is included to explain the context of the invention. This is not to be taken as an admission that any of the material referred to is published, known or part of the common general knowledge.

SUMMARY OF THE INVENTION

According to a first aspect, the present invention provides, a method of detecting if a relay is present in a PEPS system for a vehicle including the steps of: (a) transmitting from one or more antennas associated with a vehicle, a first and second LF signal and determining a minimum time gap between the two signal transmissions such that that the time gap exceeds the channel coherence time of a high frequency wireless relay; (b) determining a maximum time between the two signals allowable by a timing requirement associated with the PEPS system of the vehicle and the maximum allowable change in position of a key fob; (c) determining the time gap between the minimum time obtained at step (a) and the maximum time obtained at step (b) wherein if the time gap from step (a) is greater than the time gap from step (b), the system timing requirement is increased to provide a predetermined time; (d) separately transmitting, at the predetermined time from step (c) between the first and second LF signals, the signals having a known signal ratio, from an antenna associated with a vehicle to a key fob as part of an LF challenge; (e) measuring, at the key fob, the signal levels of the first and second LF signals; and (f) determining if the ratio of the first and second LF signals are within a pre-defined range.

Advantageously, the present invention takes advantage of using an extended time duration between two known LF signal levels (from the same vehicle antenna) in the LF challenge of a PEPS system in order to deliberately exceed the coherence time and thereby detect when an RF relay is used.

The first and second LF signals may be from a single vehicle antenna. In an alternative, step (b) is omitted and the predetermined time gap is set to the value determined at step (a).

A ratio of more than two LF signals may be analyzed.

The known signal values of the first and second LF signals may be one or more of identical or another known ratio of each other.

The known signal ratio of the first and second LF signals may be varied at each LF challenge.

It will be appreciated that at step (b) determining a maximum time between the two signals allowable by a timing requirement associated with the PEPS system of the vehicle timing requirement may include for example, the maximum time must still allow the vehicle doors to unlock for a Passive Entry request within the specifications of the system.

According to a second aspect, the present invention provides, a system for detecting if a relay is present in a PEPS system for a vehicle including: antennas associated with a vehicle and a key fob using an LF receiver to measure LF signal levels, and one or more controllers configured to: (a) transmit from one or more antennas associated with a vehicle, a first and second LF signal and determine a minimum time gap between the two signal transmissions such that the time gap exceeds the channel coherence time of a high frequency wireless relay; (b) determine a maximum time between the two signals allowable by a timing requirement associated with the PEPS system of the vehicle and the maximum allowable change in position of a key fob; (c) determine the time gap between the minimum time obtained at step (a) and the maximum time obtained at step (b) wherein if the time gap from step (a) is greater than the time gap from step (b), the system timing requirement from step (b) is increased to provide a predetermined time; (d) separately transmit, at the predetermined time from step (c) between the first and second LF signals, the signals having a known signal ratio, from an antenna associated with a vehicle to a key fob as part of an LF challenge; (e) measure, at the key fob, the signal levels of the first and second LF signals; and (f) determine if the ratio of the first and second LF signals is within a predefined range.

The controller may be located in the vehicle, however the controller may be located in both the vehicle and the key fob.

DETAILED DESCRIPTION

Figure 1:
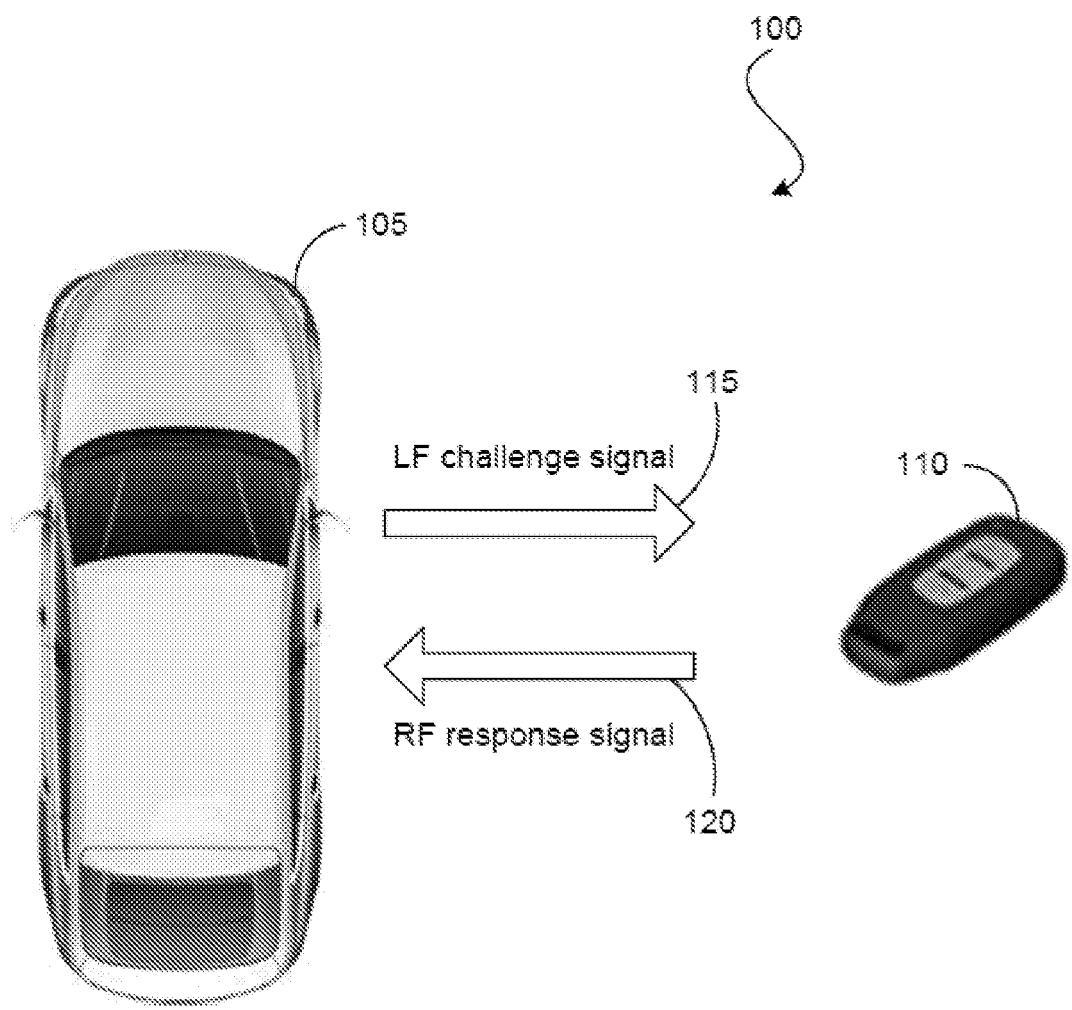
FIG. 1 is a schematic diagram illustrating a PEPS system.

FIG. 1 is a schematic diagram illustrating a vehicle PEPS system 100. The PEPS system 100 allows a vehicle owner (or possessor of the key fob) to lock/unlock and start a vehicle 105 without having to interact with the key fob 110. Typical PEPS systems define external operating regions and internal operating regions. If a key fob 110 is located within an operating region then the vehicle 105 will perform PEPS lock/unlock and start requests.

The PEPS operating regions may be defined by low frequency (LF) signal magnetic fields emitted from antennas on the vehicle. Received signal strength indicator (RSSI) can be utilized in the key fob and the PEPS system may define the external operating regions and internal operating regions using the RSSI signal levels measured from the various antennas on the vehicle 105. Then, if a key fob 110 is located within the correct regions (i.e., the RSSI levels correspond to a defined zone) then the vehicle 105 will perform the lock/unlock and start request.

PEPS systems may be configured to have a manually triggered unlock and start request (such as a capacitive sensor, push button and the like provided for example on the handle of the vehicle, or in the vehicle Start/Stop 105) to transmit the LF challenge signal 115 to the key fob 110. As part of the LF challenge signal 115, signals are transmitted from several (or all) of the vehicles antennas. If a key fob 110 is located within the expected operating regions (based on the RSSI values measured from the vehicle antennas), after receiving the LF challenge signal 115 it will transmit an authentication response signal on a radio frequency (RF) 120 allowing the request to be processed. It will be appreciated that bi-directional RF communication may also be used.

Some PEPS systems also provide permanent periodically transmitted LF challenge signals 115 prior to the manually triggered unlock request. For these systems, the vehicle knows when the key fob 110 is in the vicinity of the vehicle before an unlock request is made. The advantage of this is that it can improve system response times and provide additional features such as comfort lighting as the owner approaches the vehicle 105.

Figure 2:
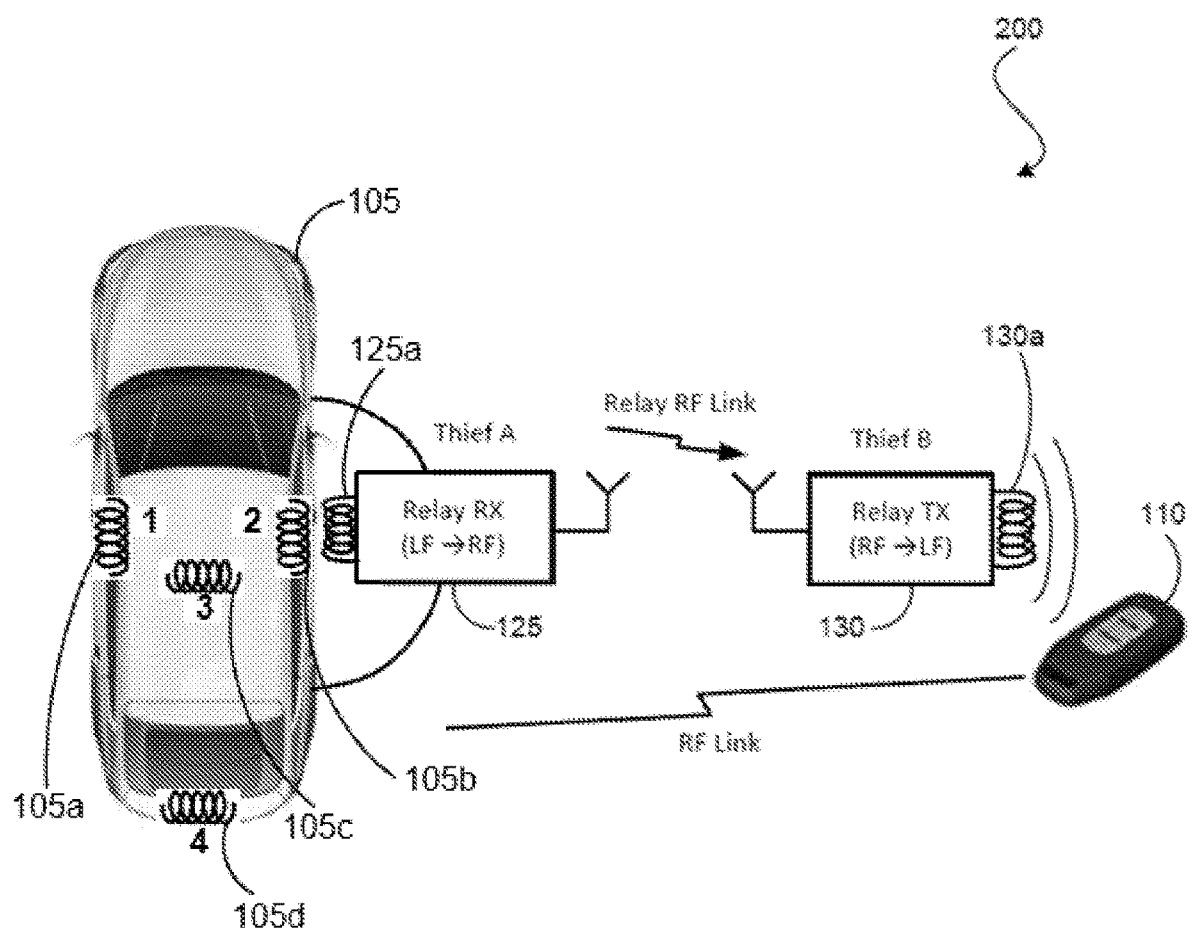
FIG. 2 is a schematic diagram illustrating a relay attack on a vehicle having a PEPS system.

As shown in the FIG. 2, the PEPS system 200 is vulnerable to theft due to what is known as "relay attack". The present invention attempts to prevent a relay attack from being successful. In FIG. 2, the relay attack involves extending the range of the LF field (shown in FIG. 1) so that a key fob 110 which is not in proximity of the vehicle 105 will receive the LF challenge signal. The relay attack requires two thieves, Thief A and Thief B where Thief A carries a relay receiver (Relay RX) 125 and is located close to the vehicle 105 while Thief B carries a relay transmitter (Relay TX) 130 and is located close to the key fob 110.

Relay RX 125 receives an LF signal from vehicle 105 and then up-converts the frequency to an RF frequency and transmits it via an RF link to Relay TX 130. Relay TX 130 receives the RF signal and then down-converts the frequency to LF and re-transmits the LF signal to the key fob 110. This scenario describes the previously defined "analog relay", however, other types of relays could be used. The key fob 110 automatically transmits an RF response upon receiving the LF challenge. The RF response signal will typically transmit between approximately 20-200 m back to the vehicle 105. If the vehicle 105 receives this response it will assume that the key fob 110 is in the vicinity of the vehicle 105 and so the request will be authenticated. In addition, the relay attack method may also be applied to extend the range of the RF response range beyond the transmit range of the key fob 110.

Advantageously, the present invention takes advantage of using an extended time duration between two known LF signal levels (from the same vehicle antenna) in the LF challenge of a PEPS (Passive Entry Passive Start) system in order to attempt to exceed the channel coherence time and thereby detect when an RF relay is used. The signals levels are "known" in the sense that their relationship to each other is known, for example, the two signals may be the same level, or one signal may be half the level of the other signal, or any other predetermined relationship can be used. The known LF signal levels may be located in the vehicle or may be provided in the key. The channel coherence time for the LF messages ensures that the amplitude of the two signals is stable. However, when a wireless relay is used the LF signal is up-converted and re-transmitted at a much higher frequency and by "Thief A" 125 as shown in FIG. 2 and then down-converted back to an LF signal again by "Thief B" 130. The coherence time for the RF signal used in the wireless relay is much less than the coherence time at the LF frequency so the effects of a relay attack may be observed as a change in the received amplitude levels of the two LF signals (as will be described further with reference to FIGS. 3 and 4).

The reduction in the coherence time can be seen in Equation 1 below, where Tc is the coherence time (us), c is the speed of light (m/s), fc the frequency (Hz) and v is the velocity (m/s) of objects in the channel:

$$T_C \approx \frac{9c}{16\pi v f_c} \quad \text{(Equation 1)}$$

Figure 3:
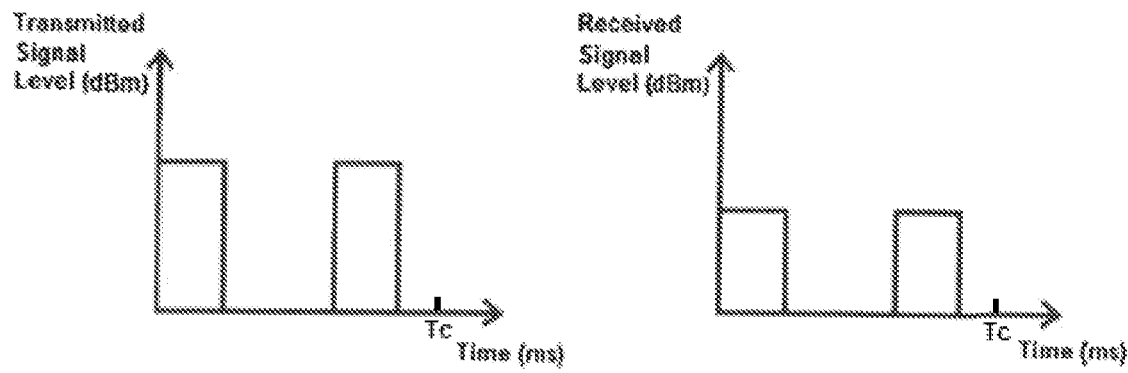
FIG. 3 is a chart illustrating amplitude levels (dBm) of two transmitted and received signals from the same antenna associated with a vehicle.

FIG. 3 illustrates amplitude levels (dBm) of two transmitted and received signals from the same antenna associated with a vehicle. Upon a PEPS request (via a key fob for example) an LF message is transmitted by the vehicle. As part of the LF challenge, two known LF signal levels are transmitted by the same LF antenna at a predetermined time. The two LF signals are transmitted within the channel coherence time Tc at the PEPS LF frequency.

The maximum time is limited to the PEPS system timing requirement, for example, the maximum time permitted for the vehicle doors to unlock for a Passive Entry request. In addition, the maximum change in position of the key fob (which implies a change in the magnetic field strength due to a change in position relative to the vehicle transmit antennas) may be restricted by the maximum time permitted. The tolerance of the ratio may be dependent of the value of the signal strength used, i.e., the proximity of the key fob to the vehicle antenna. The closer the key fob is to the antenna, the more rapidly the magnetic field varies as the key fob position changes, therefore the tolerance of the ratio calculation needs to be dependent on the magnetic field strengths measured which can be selected via empirical measurements.

As shown in FIG. 2, typical antenna orientations for a vehicle 105 may be fori example antenna 105a, 105b parallel to each other and located in the door handles while antenna 105c, 105d are parallel to each other and are located in the cabin and trunk of the vehicle respectively (although it will be appreciated that there may be more vehicle antennas provided).

The magnetic field generated by an LF antenna attenuates at a rate of $1/d^3$ when the source geometry is assumed to be a point source and d is the distance from the source. For example, if the measurement of the first LF signal is 1 cm from a vehicle antenna 105B at point A, and the send LF signal is measured when 2 cm from the same antenna at point B, i.e., the distance of point B is twice the distance as point A from the vehicle antenna. Therefore, the magnetic field intensity at point B is $1/d^3=\frac{1}{2}^3=0.125$ or 12.5% of the field intensity measured at point A. However, if the measurement of the first LF signal is 121 cm from a vehicle antenna 105A at point A, and the send LF signal is measured when 119 cm from the same antenna at point B, i.e., the distance of point B is 120.5/119.5=1.008 the distance as point A. Therefore, the field intensity at point B is $1/d^3=1/1.008^3=0.975$ or 97.5% of the field intensity measured at point A. This highlights that the two signals to be analyzed may be transmitted from an antenna that is not close to the key fob to ensure that any change in the ratio of the two signals measured is due to the channel and not a slight change in position of the key fob. For example, if the key fob is in the PEPS entry zone near antenna 105B, LF signals from this antenna should not be used to determine the signal ratio, i.e., perform the analysis using LF signals from antennas 105A, 105C or 105D.

The predetermined time gap between the two LF signals is selected to a value between the minimum time gap and the maximum time gap obtained from the above methods. If the minimum time calculated is greater than the maximum time calculated, the system timing requirement from needs to be increased in order for this method to be applicable. Alternatively, instead of selecting a time gap between the minimum and maximum values, the minimum time gap can simply be selected (as long as the system timing is within specification). However, it is recommended to select a time gap as large as possible in order for the method to detect a wireless relay operating at a frequency that is lower than anticipated.

The channel coherence time for LF signals is very long compared to the coherence time for high frequency RF signals. In addition, since the coherence time for LF signals is greater than the PEPS system timing requirement (which determines the maximum time between the two LF signals), the amplitude of the two LF signals in the communication channel is stable (as long as the key fob movement that occurred between the two signals is restricted as discussed above).

FIG. 3 shows an example of the amplitude levels of two transmitted and received LF signals from the same vehicle antenna, the amplitudes of the two received signal levels are shown to be stable, i.e., their relative amplitudes are identical to the transmitted signal amplitudes. The coherence time describes the time dispersive nature of the channel in a local area. The two LF signals are transmitted within the channel coherence time Tc at the PEPS LF frequency. It describes the time varying nature of the channel caused by either relative motion between the key fob and vehicle, or by movement of objects in the channel. As discussed, the key fob should be relatively stationary during a PEPS Entry or Start command so any channel variation is due to the movement of other objects in the channel.

The coherence time for the RF signal used in the wireless relay is much less than at the LF frequency so the effects of a relay attack may then be observed as a change in the received amplitude levels of the two LF signals.

Equation 1 indicates that the channel coherence time is dependent on the velocity of objects in the channel, the faster an object is moving, the smaller the channel coherence time. The predetermined time gap used between the two LF signals ensures that the channel coherence time is not exceeded in order for the ratio between the two amplitude levels to be unaffected by the channel. Assuming the PEPS system operates at a frequency of 125 kHz and that objects in the channel can move up speeds up to 200 km/hr (~55 m/s) the channel coherence time is calculated from Equation 1 as ~8s. This far exceeds the system timing for a PEPS system which ensures that the measurements of the two LF signals will be stable during the measurement time.

On the assumption that most wireless relays operate with a minimum frequency of 300 MHz (this is likely a valid assumption based on relays previously investigated by the applicant) that objects in the channel are moving at speeds as low as 7 km/hr (~2 m/s) the channel coherence time is calculated from Equation 1 as ~89 ms. For this example, this is the minimum time gap between the two signals to be analyzed. As can be seen from Equation 1, the success of this method in detecting a relay is dependent on the relay operational frequency and the speed that objects move within the channel.

As previously discussed, the maximum time between the two signals allowed by the PEPS system timing requirement (i.e., the maximum time must still allow the vehicle doors to unlock for a Passive Entry request within specification) and the maximum allowable change in position of the key fob (which implies a change in the magnetic field strength due to a change in position relative to the vehicle transmit antennas).

Figure 4:
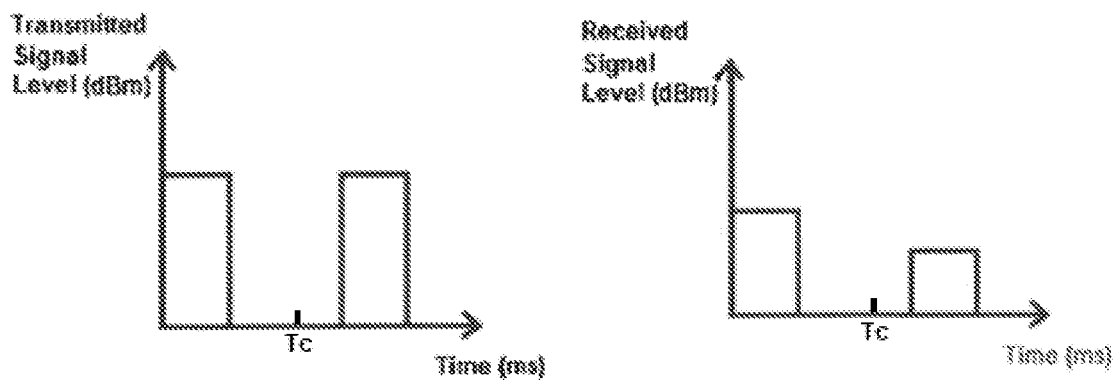
FIG. 4 is a chart illustrating amplitude levels (dBm) of two transmitted and received signals from the same antenna after they have been relayed over RF.

FIG. 4 shows an example of the relative amplitude levels of two transmitted and received LF signals (from the same vehicle antenna) after they have been relayed over RF. The two signals were not transmitted within the coherence time of the channel at this frequency and the amplitude of the two received signal levels are shown to be unstable, i.e., their relative amplitudes are different to the transmitted signal amplitudes. The second LF signal is transmitted after the channel coherence time Tc due to the increased frequency of the wireless relay.

The amplitude of the two received LF signal levels must be measured by the key fob electronics. The key fob contains electronic circuitry in order to receive and process LF messages and to transmit RF messages. The signal levels must be compared in the key fob or in the vehicle receiver with tolerances included. The concept of applying the channel coherence principle to the LF message in order to detect a relay attack is essential for this method. If the two LF signal levels do not lie within the expected range (tolerances included) then a relay attack has occurred and the PEPS process can be terminated.

Figure 5:
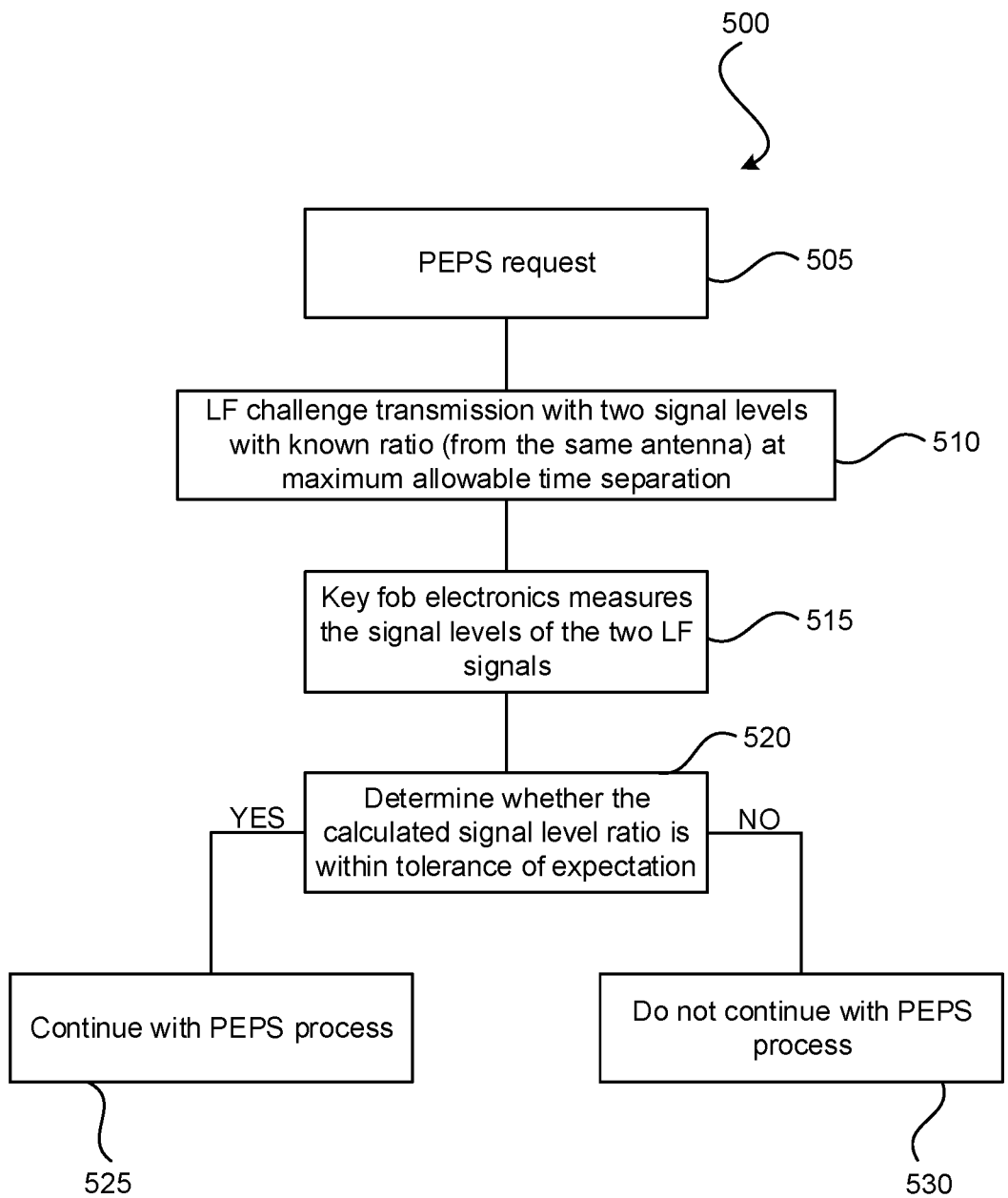
FIG. 5 is a flow diagram illustrating the method of the present invention to prevent a relay attack on the vehicle having a PEPS system.

In operation, as shown in FIG. 5 the method 500 includes detecting if a relay is present in a PEPS system for a vehicle, where at step 505 a PEPS request is initiated, before control moves to step 510 where first and second LF signals having known signal values are transmitted, at a predetermined time separation, from an antenna associated with a vehicle to a key fob as part of an LF challenge. A measurement is made by the key fob at step 515 of the signal levels of the first and second known LF signals determining a minimum time gap between the two signal transmissions such that that the time gap exceeds the channel coherence time of a high frequency wireless relay. A maximum time is between the two signals allowable by a timing requirement associated with the PEPS system of the vehicle and the maximum allowable change in position of a key fob is determined and a time gap between the minimum time and the maximum time is determined. Control then moves to step 520 where it is determined if the measured ratio of the first and second LF signals measured by the key fob is within a predefined range (dependent on system tolerances) of the expected ratio.

In the event that the measured ratio between the first and second LF signals is within the predefined range, control moves to step 525 where the PEPS process is continued (i.e., to open a door on the vehicle or the like). Otherwise, if the measured ratio between the first and second LF signals is not within the predefined range—a relay is likely present and control moves to step 530 where the PEPS process is discontinued.

The present invention has the vehicle transmitting signal sequentially and for one of the antennas the present invention retransmits another signal at the same level or at another level such that the ratio between the signals is known such that if a relay is in place, the ratio is changed.

In contrast to prior art approaches which may, for example, carry out a multiple amplitude check (i.e., sending a signal at one level and then a signal at another level at another point in time and try and capture a ratio change) the present invention separates the signals as much as possible in time.

The present invention may even transmit signals at the same level and in that case hope to see a 1:1 ratio change. The present invention thereby detects changes in the channel as opposed to, for example, detecting a limitation of the relay. However, as will be appreciated, providing different levels is also advantageous.

The claims defining the invention are as follows:

1. A method of detecting if a relay is present in a passive entry passive start (PEPS) system for a vehicle, the method comprising:
   (a) transmitting from one or more antennas associated with a vehicle, a first low frequency (LF) signal and a second low frequency (LF) signal and determining a minimum time gap between the first LF signal and the second LF signal such that that the minimum time gap exceeds a channel coherence time of a high frequency wireless relay;
   (b) determining a maximum time gap between the first LF signal and the second LF signal allowable by a timing requirement associated with the PEPS system of the vehicle and a maximum allowable change in position of a key fob;
   (c) determining the time gap between the minimum time gap obtained at step (a) and the maximum time gap obtained at step (b) wherein if the minimum time gap from step (a) is greater than the maximum time gap from step (b), a system timing requirement is increased to provide a predetermined time gap;
   (d) separately transmitting, at the predetermined time gap from step (c) between the first LF signal and the second LF signal, the signals having a known signal ratio, from an antenna associated with a vehicle to a key fob as part of an LF challenge;
   (e) measuring, at the key fob, signal levels of the first LF signal and the second LF signal; and
   (f) determining if a ratio of the first LF signal and the second LF signal are within a predefined range.

2. The method of claim 1, wherein the first LF signal and the second LF signal are from a single vehicle antenna.

3. The method of claim 1, wherein step (b) is omitted and the predetermined time gap is set to the value determined at step (a).

4. The method of claim 1, wherein a ratio of more than two LF signals is analyzed.

5. The method of claim 1, wherein known signal values of the first LF signal and the second LF signal are one or more of identical or another known ratio of each other.

6. The method of claim 1, wherein a known signal ratio of the first LF signal and the second LF signal is varied at each LF challenge.

7. A system for detecting if a relay is present in a passive entry passive start (PEPS) system for a vehicle, comprising:

antennas associated with the vehicle and a key fob using an low frequency (LF) receiver to measure LF signal levels; and at least one controller configured to perform the following:
  (a) transmitting from one or more antennas associated with a vehicle, a first and second LF signal and determine a minimum time gap between the first LF signal and the second LF signal such that the minimum time gap exceeds a channel coherence time of a high frequency wireless relay;
  (b) determining a maximum time gap between the first LF signal and the second LF signal allowable by a timing requirement associated with the PEPS system of the vehicle and a maximum allowable change in position of a key fob;
  (c) determining the time gap between the minimum time gap obtained at step (a) and the maximum time gap obtained at step (b) wherein if the minimum time gap from step (a) is greater than the maximum time gap from step (b), a system timing requirement from step (b) is increased to provide a predetermined time gap;
  (d) separately transmitting, at the predetermined time gap from step (c) between the first LF signal and the second LF signal, the signals having a known signal ratio, from an antenna associated with a vehicle to a key fob as part of an LF challenge;
  (e) measuring, at the key fob, signal levels of the first LF signal and the second LF signal; and
  (f) determining if a ratio of the first LF signal and the second LF signal is within a predefined range.

8. The system of claim 7, wherein the controller is located in the vehicle.

9. The system of claim 7, wherein the controller is located in both the vehicle and the key fob.

* * * * *